US008436825B2

United States Patent
Coni et al.

(10) Patent No.: US 8,436,825 B2
(45) Date of Patent: May 7, 2013

(54) HAPTIC INTERACTION DEVICE

(75) Inventors: Philippe Coni, St Jean d'Illac (FR); Arnaud Petitdemange, Blanquefort (FR)

(73) Assignee: Thales, Neuilly sur Seine (FR)

( * ) Notice: Subject to any disclaimer, the term of this patent is extended or adjusted under 35 U.S.C. 154(b) by 248 days.

(21) Appl. No.: 13/078,044

(22) Filed: Apr. 1, 2011

(65) Prior Publication Data
US 2012/0075210 A1 Mar. 29, 2012

(30) Foreign Application Priority Data

Apr. 2, 2010 (FR) ...................................... 10 01391

(51) Int. Cl.
*G06F 3/041* (2006.01)
(52) U.S. Cl.
USPC ............................ 345/173; 178/18.01; 463/30
(58) Field of Classification Search .................. 345/173; 178/18.01; 463/30, 36; 715/701–702
See application file for complete search history.

(56) References Cited

U.S. PATENT DOCUMENTS

| 6,822,635 | B2 | 11/2004 | Shahoian et al. |
| 7,602,384 | B2 | 10/2009 | Rosenberg et al. |
| 7,920,126 | B2 * | 4/2011 | Prados et al. ................. 345/173 |
| 2004/0227721 | A1 | 11/2004 | Moilanen et al. |

OTHER PUBLICATIONS

Levin, M., et al.: "Tactile—Feedback Solutions for an Enhanced User Experience," Information Display, Palisades Institute for Research Services, New York, Jan. 1, 2009, pp. 18-21.
Maeno, T., et al., "Tactile Display of Surface Texture by use of Amplitude Modulation of Ultrasonic Vibration," 2006 IEEE Ultrasonics Symposium, 1051-0117/06, 2006, pp. 62-65.
Levin, M., et al., "Tactile—Feedback Solutions for an Enhanced User Experience," Information Display Oct. 2009, 2009, pp. 18-21.

* cited by examiner

*Primary Examiner* — Abbas Abdulselam
(74) *Attorney, Agent, or Firm* — Baker Hostetler LLP

(57) ABSTRACT

A interaction device includes a touch-sensitive surface which generates input data when the touch-sensitive surface is in contact with an actuator, a frame fixed to a periphery of the touch-sensitive surface, an actuator which generates a reaction force as a function of the input data, and a support to which the actuator is coupled. The frame and the touch-sensitive surface are arranged to form a rigid assembly which has a resonant frequency of a few hundred Hertz. The actuator is directly coupled to the frame to displace the rigid assembly relative to the support, and the resonant frequency of the actuator is substantially equal to the resonant frequency of the rigid assembly.

9 Claims, 2 Drawing Sheets

HAPTIC INTERACTION DEVICE

CROSS-REFERENCE TO RELATED APPLICATION

This application claims priority to foreign French patent application No. FR 10 01391, filed on Apr. 2, 2010, the disclosure of which is incorporated by reference in its entirety.

FIELD OF THE INVENTION

The field of the invention relates to interaction devices that have a touch-sensitive surface and, more particularly, to display devices that have a diagonal of at least ten inches, for example, although not being limited thereto.

BACKGROUND OF THE INVENTION

Touch-sensitive display devices typically include a screen for displaying data and an active layer arranged directly in front of the screen, between the observer and the screen. This active layer comprises a touch-sensitive surface activated by the finger or the hand of a user or any other actuation means and makes it possible to control an item of equipment or a system through a graphic interface presented by the screen. There are a large number of possible uses. In particular, there are the aeronautical applications in which a pilot can thus monitor and control all the functions displayed by the avionics system of the aircraft.

Such interfaces have to present feedback to the user, for example the change of state of a button, so that the operator can see the transition from non-activated to activated, and thus confirm his interaction. The touch-sensitive surface mode of interaction with a user is not very collaborative and errors can occur, associated with the doubt concerning the activation or non-activation of the command, for example in the case of blind commands where the pilot must first of all carry out his main task by looking outside. For this, the display devices may involve the auditory sense of the user by generating a sound to provide the feedback.

However, in a noisy environment, notably an aircraft cockpit, it is not always easy to perceive this feedback.

Also known are haptic systems with force feedback which make it possible to increase the reality of the interaction, by providing physiological feedback concerning the state of the activated object. According to the state of the art generally found, this feedback is triggered solely on the condition of presence of the activation means, generally the finger. In reality, when a control element of a system is activated, such as, for example, a pushbutton or a potentiometer, the latter reacts to the press action, because it has a reaction function, which may be its stiffness, its travel, its viscosity, its triggering threshold. For example, a pushbutton has a pre-travel, its depression law depends on its stiffness and on the force applied by the activation means. However, beyond a certain value, the reaction force of the pushbutton decreases abruptly, and it is at this precise instant that activation occurs (and only if the force has reached this threshold). This law is reversible when the button is released. This property is called the haptic reaction function. This function involves physical touch, also called kinesthesics, that is to say, related to the nervous and muscular system of the operator. Similarly, a surface state, a texture, may be characterized by a haptic reaction function, and in this case, involve sensory receptors located at the ends of the nerve terminations of the skin, called pacinian receptors.

There are haptic systems that use a touch-sensitive surface set in vibratory motion by means of actuators. An actuator is an electromechanical system which makes it possible to transform electrical energy into mechanical energy more often than not in the form of a motion of a mechanical part. It is generally driven by a controller linked to a computer device.

These actuators are of different types:

Eccentric rotor mass (ERM): This is an eccentric mass which creates radial inertia forces. All of the system vibrates, and because of this, this device applies only to roaming instruments. In practice, for a fixed item of equipment on a rigid support, the effect will be zero, or worse, if the support is flexible, it might enter into resonance.

Seismic resonant mass (LRM): A mass suspended by a spring is set into resonance by an electromagnetic or electrostatic device. This principle suffers from the same drawback as the first.

Electromagnetic: The actuator consists of a frame that can be distorted by the displacement of a core within a coil. The lateral displacement produced is retransmitted to the screen by virtue of an armature. Such a device is, for example described in the Patent WO2006124873A1.

Piezo bimorph: Two types of actuators are used: vibrating plate ("piezo beam") and blister discs ("piezo disc"). These actuators use the shear forces induced by the piezoceramic covering one or two faces of the actuator. An example of such a device is given in the Patent US2008122315A1.

Electrostatic: By capacitive effect, two parallel layers covering the screen are drawn together or pushed apart to stimulate the interacting object.

With shape memory: Some materials revert to a particular shape when they are subjected to a certain temperature.

These generalities will be better understood by referring to "Tactile-Feedback Solution for an Enhanced User Experience, M. Levin and A. Woo, Information Display October 2009 Vol. 25 No. 10"

Not all these systems are suited to reproducing kinesthesic effects, and particularly on large screens, producing significant inertial forces under dynamic stress. For example, in the Patent Application US2007080951A1, piezo bimorph actuators are arranged directly behind a touch-sensitive surface between a support frame and the touch-sensitive surfaces, but they deliver only forces of the order of a Newton, which is insufficient to oppose the force of an operator. In addition, the large touch-sensitive surface, that is to say, the surfaces that have a diagonal that is at least equal to 15 inches, have low resonant frequencies making it difficult to generate vibrotactile effects to the frequencies sensitive to the pacinian receptors which lie within a frequency band of the order of 150 to 250 Hz. In addition, the actuators cited and currently used produce forces normal to the screen that are very low, well below what an operator can produce. It would be possible to consider multiplying the number of actuators, but this would increase the price, the consumption, the bulk and the weight of the system.

Piezoceramics are known which are elongated according to the voltage applied. However, this elongation is of the order of 0.1%. Thus, to obtain 0.5 mm of travel, an actuator 50 cm long would be needed, which is not feasible on a flat screen.

Also known is the International Patent Application WO2009/088707 describing a display device comprising a touch-sensitive surface, a frame on which the touch-sensitive surface rests and actuators assembled with rails producing motions parallel to the plane of the touch-sensitive surface. The rails extending longitudinally along the frame are mechanically coupled with the frame and the fixed support of the display device. The rails make it possible to reduce the number of actuators needed in such a device. The actuators used to implement the haptic device are not suited to use in large size screens.

Some devices laterally displace the touch-sensitive surface, so as to benefit from a greater rigidity, but in this case, the reproduction of kinesthesic effects is no longer possible, since the force applied by the operator is normal to the screen, and the device cannot oppose it.

Another problem is the rigidity of the screen, the latter having a tendency to flex at the centre. Because of this, under a lateral excitation, it will have a tendency to resonate at a lower frequency and therefore to damp the transmitted effects.

SUMMARY OF THE INVENTION

The invention provides a reliable haptic solution for display devices of large size, e.g., of at least a 15-inch diagonal size, although additional embodiments are not limited thereto, to realistically simulate any kind of button.

More specifically, the invention includes an interaction device having a touch-sensitive surface capable of generating input data when the touch-sensitive surface is in contact with an actuator, a frame fixed to the periphery of the touch-sensitive surface, an actuator capable of generating a reaction force as a function of the input data and a fixed support to which the actuator is coupled.

Advantageously, the frame and the touch-sensitive surface are arranged so as to form a rigid assembly that has a resonant frequency of at least a hundred Hertz and in that the actuator is directly coupled to the frame to displace the rigid assembly relative to the fixed support, the resonant frequency of said actuator being substantially equal to the resonant frequency of the rigid assembly.

According to another embodiment, the touch-sensitive surface is planar and the actuator generates a reaction force along an axis perpendicular to the plane of the touch-sensitive surface.

The resonant frequency of the rigid assembly may be approximately 200 Hz.

According to another embodiment, the detection of a contact with the touch-sensitive surface is secured by a force measuring device.

According to still another embodiment, the device comprises four actuators capable of setting the rigid assembly into motion.

According to yet another embodiment, an actuator is a piezoelectric actuator.

According to another embodiment, the touch-sensitive surface is of rectangular shape with a diagonal of at least ten or so inches.

According to another embodiment, the device also includes a flat screen, notably of liquid crystal type.

The structure having, on the one hand, the rigid assembly, the touch-sensitive surface and the frame, and, on the other hand, the amplified actuators, simulates a wide variety of force feedback effects for touch-sensitive surfaces, particularly those with a large diagonal size, as compared to known devices.

Furthermore, the resonant frequency of the rigid assembly is advantageously adapted in one or more embodiments to enhance the sensation of the effect produced by the user actuating the interaction device by the fact that the pacinian receptors are receptive to this resonant frequency.

Furthermore, in one or more embodiments, the mounting of the rigid assembly is designed to resonate at a frequency adjacent to 200 Hz, a frequency at which the actuators have their electrical resonance. Thus, the setting into motion of the slab will be assisted by the resonance phenomenon, thus limiting the electrical power needed for the actuators.

BRIEF DESCRIPTION OF THE DRAWINGS

The invention will be better understood and additional aspects, features, and advantages will become more readily apparent from reading the following detailed description, given as a nonlimiting example, and in view of the appended figures, in which.

DETAILED DESCRIPTION

Embodiments of the invention provide a technical solution for development of touch-sensitive and haptic interaction devices, which may have large surface areas, e.g., screens with a diagonal size greater than approximately 10 inches. It will be understood, however, that additional embodiments are not limited to the aforementioned screen size. The display device may be used in aircraft instrument panels, for example, but quite clearly relates to any kind of application, such as domestic multimedia hardware or public usage terminals provided in more exposed environments than the homes of individuals, for example.

Figure 1:
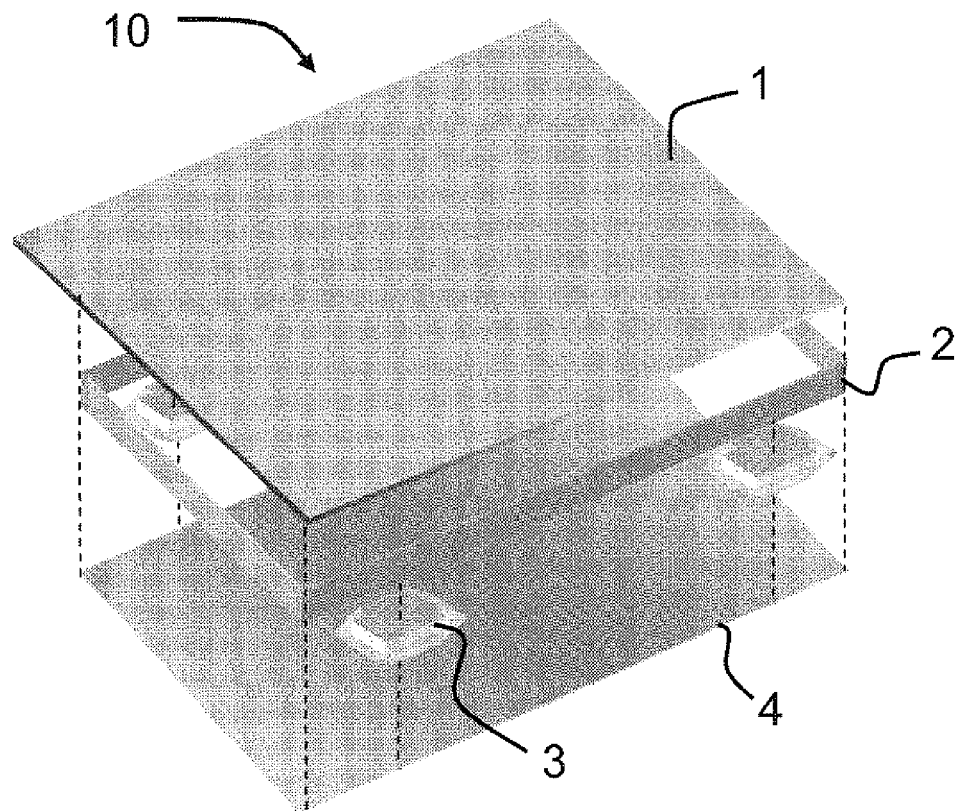
FIG. 1 represents an assembly diagram of the interaction device according to the invention.

FIG. 1 represents one embodiment of a display device assembly for a screen with a diagonal measuring approximately 15 inches. The screen is not shown in the figure. In practice, the type of screens used in the display device is not a limiting characteristic of the invention. Preferably, a flat screen technology is used in order to propose a display device of low depth. There are, for example, LCD screens, plasma screens, LED (light-emitting diode) lighting devices or OLED (organic light-emitting diode) lighting devices or any other device for displaying images. The screen may be fixed directly to one face of the touch-sensitive surface or be mounted inside the display device between the touch-sensitive surface 1 and the support 4 of the display device.

The display device 10 includes a touch-sensitive surface 1 mounted on the front face, the front face being defined as the face presented to the observer and the one presenting the images. Just as for the screen, the touch-sensitive surface technology used does not limit the scope of the invention. The touch-sensitive surface 1 may be a touch-sensitive layer that is capacitive, resistive or of any other technology making it possible to detect the presence of an actuator pointing to a region of the touch-sensitive surface. The touch-sensitive surface 1 is arranged between the actuator and the screen so as to detect the region pointed to by the actuator. The term "actuator" should be understood to mean any object used to point to a region of the screen, that is to say, the finger of the operator or a stylus for example.

The display device 10 includes a frame 2 coupled to the touch-sensitive surface 1 so as to form a rigid assembly that has a resonant frequency within a band of values situated at a few hundreds of Hz. The frame consists of a material having a low inertia and high rigidity. The frame 2 and the touch-sensitive surface 1 may be coupled by gluing, by clamping or screw-fixing assembly means. The frame 2 is fixed to the surface 1 preferably on the peripheral region of the touch-sensitive surface, on the edges of the touch-sensitive surface or the underside of the surface or also via the top of the surface. In the latter case, the frame is directly visible to the user.

Figure 2:
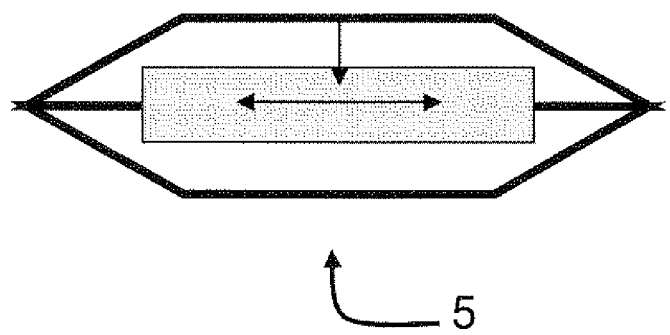
FIG. 2 represents a piezoelectric actuator with amplification.

The display device includes four actuators 3 distributed over the four corners of the display device. The actuators 3 may also be located in other positions of the display device 10. The actuators used are actuators that are said to be amplified because these elements are capable of mechanically amplifying their travels. Such actuators are capable of generating a force of several tens of Newtons and up to several hundreds. One example that can be cited is an amplified actuator as described in the French patent application FR2740276A1. FIG. 2 represents an actuator with amplification 5 as described in that application. These piezoelectric actuators generate a vertical motion by deformation of the structure. They make it possible to obtain a travel proportional to the voltage applied, from an almost steady state up to ultrasonic frequencies. They thus make it possible to produce a significant effect, greater than what an operator can produce with his finger on the touch-sensitive surface.

The actuators 3 are coupled on the one hand to the support 4 of the display device and on the other hand to the frame 2. The support 4 is the structural part of the display device 10 that can be coupled to a reception part fixed inside the cockpit of the aircraft. The support 4 is fixedly and immovably mounted in the cockpit relative to the receiver. This support 4 may, for example, be a structural part that can be inserted into a receiving rack.

The actuators 3, the frame 2 and the touch-sensitive surface 1 are arranged so that the frame and the touch-sensitive surface form a rigid assembly whose resonant frequency is located in a frequency band corresponding to the sensitivity frequency band of the pacinian receptors of an individual, that is to say, approximately between 50 and 200 Hz and such that the actuators set this rigid assembly into motion as a function of input data generated by the contact action of an actuator with the touch-sensitive surface. The actuators operate at a resonant frequency similar to the resonant frequency of the assembly consisting of the touch-sensitive surface 1 and the frame 2, so the actuators require less excitation energy to set the rigid assembly into motion. The invention makes it possible to implement a haptic display device of large size in an embedded environment subject to high consumption stresses. Preferably, the resonant frequency chosen by the rigid assembly is substantially equal to 200 Hz.

Figure 3:
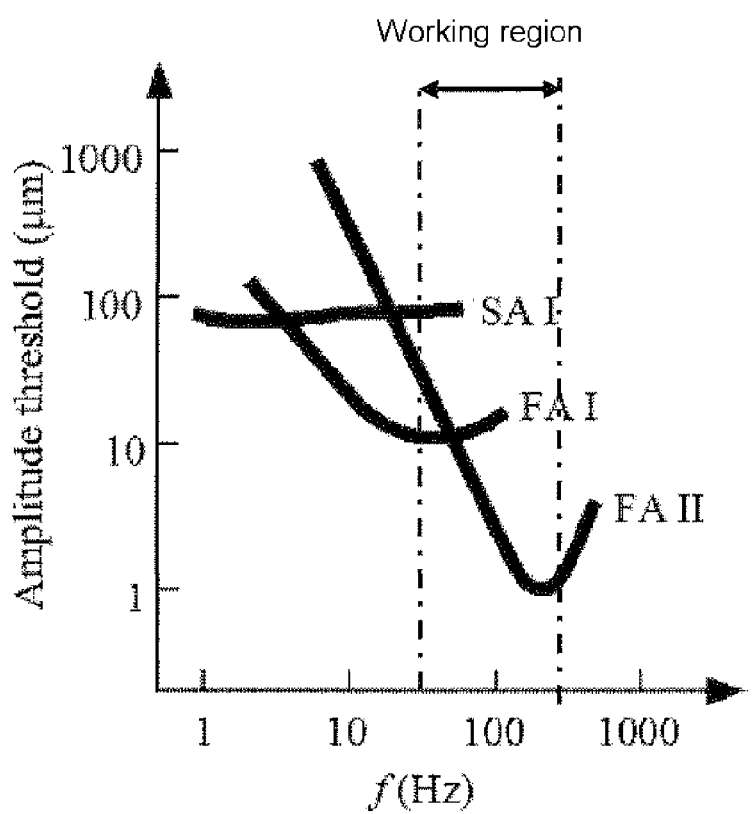
FIG. 3 is a graph illustrating the region of sensitivity of the pacinian receptors.

FIG. 3 (extracted from the publication entitled "Tactile Display of Surface Texture by use of Amplitude Modulation of Ultrasonic Vibration", 1051-0117/06© 2006 IEEE) shows the sensibility of the touch-sensitive receptors.

The epidermis of the sensitive extremities such as the fingers contain so-called "pacinian" receptors that are sensitive to vibratory stresses. There are two families: the fast adaptive FA receptors and the slowly adaptive SA receptors, each of these categories being divided into two types, I and II.

The horizontal axis of the graph gives the frequencies at which a touch-sensitive surface is made to vibrate. The vertical axis shows the amplitude of motion of the touch-sensitive surface.

The curves FA II, FA I and SA I are of more particular interest to us in reproducing haptic effects and the benefit of operating at frequencies of the order of 50 to 200 Hz will thus be better understood.

The actuators 3 mounted in the display device 10 generate a motion in a direction normal to the plane consisting of the touch-sensitive surface 1. It is thus possible to faithfully reproduce the kinaesthetic effects of dynamic objects such as switches, knobs or any other control member.

Furthermore, the display device 10 may advantageously be provided with a force measuring system. It is well known that certain types of touch-sensitive surface may provide false press actions, for example by an undesirable environmental stress. In this case, a force measuring device makes it possible not to trigger effects inopportunely. This device may be strain gauges, known from the state of the art and as described, for example, in American patent U.S. Pat. No. 5,801,682. It is also possible to use the force measurement obtained by tactile function as described in the international application WO 2008065205. Any equivalent force measuring system may be used. Advantageously, an actuator of piezoelectric type is preferably used because it has the reversible property of generating a voltage proportional to the force applied.

The invention applies, for example, to display devices in environments where the user is stressed by a multitude of information items and tasks to be executed and for which it is important to obtain feedback via the sense of touch in addition to the visual sense. The fields are varied and may be cockpits of aircraft or passenger compartments of cars, for example.

What is claimed is:

1. An interaction device assembly including a reception part, said interaction device comprising:
   a touch-sensitive surface which generates input data when said touch-sensitive surface is in contact with an actuator;
   a frame fixed to a periphery of said touch-sensitive surface;
   an actuator which generates a reaction force as a function of said input data;
   and a support to which said actuator is coupled, said support being immovably coupled with the reception part, wherein
   the frame and the touch-sensitive surface are arranged to form a rigid assembly which has a resonant frequency of at least one hundred Hertz,
   the actuator is directly coupled to the frame to displace the rigid assembly relative to the support, and
   the resonant frequency of said actuator is substantially equal to the resonant frequency of the rigid assembly.

2. The device according to claim 1, wherein the touch-sensitive surface is planar and the actuator generates a reaction force along an axis perpendicular to the plane of the touch-sensitive surface.

3. The device according to claim 1, wherein the resonant frequency of the rigid assembly is approximately 200 Hertz.

4. The device according to claim 1, wherein the detection of a contact with the touch-sensitive surface is secured by a force measuring device.

5. The device according to claim 1, further comprising four actuators which set the rigid assembly into motion.

6. The device according to claim 1, wherein the actuator is a piezoelectric actuator.

7. The device according to claim 1, wherein the touch-sensitive surface is of rectangular shape with a diagonal of at least approximately ten inches.

8. The device according to claim 1, further comprising a flat screen.

9. The device according to claim 8, wherein the flat screen is of a liquid crystal type.

* * * * *